3,455,997
PROCESS FOR THE PREPARATION OF 3,7-DI-
METHYL-5,7-OCTADIENE-1-YL ESTERS
Emile H. Eschinasi, West Orange, N.J., assignor to
Givaudan Corporation, Clifton, N.J., a corporation
of New Jersey
No Drawing. Filed July 14, 1966, Ser. No. 565,063
Int. Cl. C07c 69/52
U.S. Cl. 260—489                    13 Claims

ABSTRACT OF THE DISCLOSURE

A new process for preparing 3,7-dimethyl-5,7-octadiene-1-yl esters (V) is disclosed. This process is represented schematically as follows:

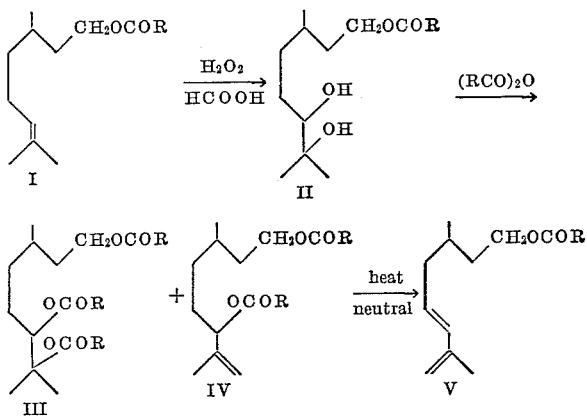

The esters, V, are useful in a known process for making rosoxide, a valuable perfume material.

---

The present invention relates to a process for the preparation of 3,7-dimethyl-5,7-ocetadiene-1-yl esters, which are intermediates in a known process for the production of rosoxide, a valuable perfume material.

The very fragrant rosoxide is the cyclic ether, cis-trans 2-(2' - methyl-1'-propen-1'-yl)-4-methyltetrahydropyran, which is found in natural rose and geranium oils. [C. F. Seidel et al., Helv. XLII, 1830(1959), XLIV, 598(1961); Y. R. Naves et al., Bull. Soc. Chem. Fr. 645(1961)].

Inasmuch as the corresponding natural aromatic oils are expensive and in short supply, attempts have been made to produce rosoxide synthetically. [C. F. Seidel et al., Helv. Chem. Acta. XLIV, 598(1961); Y. R. Naves et al., Helv. Chem. Acta. XLIV 1867(1961)]. The Seidel et al synthesis, which is also described in U.S. Patent 3,161,657, issued Dec. 15, 1964, is disadvantageous in that it requires the use of the expensive reagents, N-bromosuccinimid, lithium salts and dimethylformamide. Another process which has been described in Naves et al., U.S. Patent 3,166,575, issued Jan. 19, 1965, while satisfactory in the laboratory, when conducted on a large scale has not produced satisfactory yields. Moreover, the methods of Seidel et al., and Naves et al., both suffer from the disadvantage that the successive steps lead to a complex reaction mixture containing a plurality of intermediate isomers, from which it is difficult to separate a single pure intermediate for conversion to the desired perfume material, rosoxide. This makes it necessary to use mixed isomers in the conversion thus tending to reduce the yield of the desired rosoxide and to produce by-products of less desirable odor characteristics.

The process of the present invention comprises hydroxylation of a selected citronellyl ester to the corresponding 6,7-dihydroxy-substituted ester, acylating the latter, and pyrolyzing the resulting polyesters under neutral conditions to form, selectively, the trans stereoisomer of the 3,7-dimethyl-5,7-octadiene-1-yl ester, which can be readily separated from the reaction mixture and converted to rosoxide by known procedures. The citronellyl esters employed as starting materials are those in which the ester group contains 1 to 4 carbon atoms, citronellyl acetate being preferred. The acylating agent employed in the second step of the process may provide ester groups on the 6- and 7-positions which are the same or different than the ester group on the 1-position, but which also contain 1 to 4 carbon atoms.

More specifically, using the preferred reactants for illustration, the process of the invention comprises hydroxylation of citronellyl acetate to 3,7-dimethyl-6,7-dihydroxyoctan-1-yl acetate, acetylating the latter and pyrolyzing the resulting polyesters under neutral conditions to form, selectively, trans 3,7-dimethyl-5,7-octadiene-1-yl acetate.

The single isomer intermediate, trans-3,7-dimethyl-5,7-octadiene-1-yl acetate, or the corresponding formate, propionate or butyrate ester, may be readily converted to rosoxide according to known procedures involving saponification to the corresponding alcohol and conversion of the alcohol to rosoxide in the presence of acid cyclizing catalysts. More specifically, the method of the Seidel et al., U.S. Patent 3,161,657, may be used for converting the single isomer intermediate of the new process to rosoxide; the trans 3,7-dimethyl-5,7-octadiene-1-yl acetate or other esters having 2 to 5 carbon atoms in the acyl group, being saponified to 3,7-dimethyl-5,7-octadiene-1-ol, and the latter cyclized to cis-trans 2-(2'-methyl-1'-propen-1'-yl)-4-methyltetrahydropyran (rosoxide) by heating in solution in the presence of catalytic amounts of an aryl sulfonic acid, e.g., benzene sulfonic acid or p-toluene sulfonic acid.

The process of the invention may be illustrated as follows:

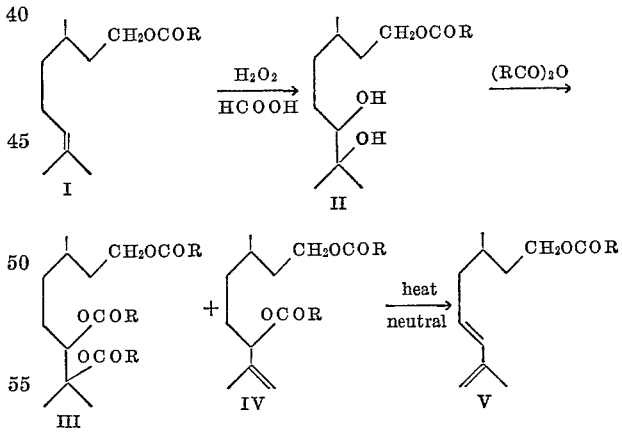

I—citronellyl ester
II—3,7-diethyl-6,7-dihydroxyoctan-1-yl ester
III—3,7-dimethyl-1,6,7-triacyloxyoctane
IV—3,7-dimethyl-1,6-diacyloxy-7-octene
V—trans-3,7-dimethyl-5,7-octadiene-1-yl ester In the above formulas the ester groups contain 1 to 4 carbon atoms and, therefore, R is hydrogen or a lower alkyl group containing 1 to 3 carbon atoms. In Compound III the ester group at the 1-position can be the same or different from the ester groups on the 6- and 7-positions.

The conversion of the single isomer intermediate produced by the process of the present invention, trans-3,7- dimethyl-5,7-octadiene-1-yl ester, to rosoxide may be illustrated as follows:

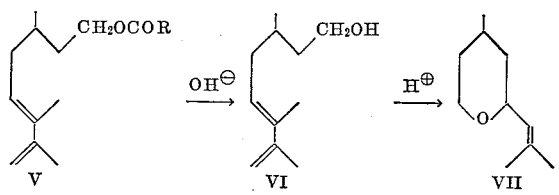

VI—trans-3,7-dimethyl-5,7-octadiene-1-ol (dehydrorhodinol)
VII—cis,trans-2-(2'-methyl-1'-propen-1'-yl)-4-methyltetrahydropyran (rosoxide)

It should be noted that pyrolysis of the mixed polyesters (III and IV) under neutral conditions selectively produces the trans isomer of the ester (V). This provides a primary advantage of the process of the present invention, since it affords a single isomer for conversion to the desired perfume material, rosoxide. In this conversion the trans esters (V), which have pleasant pear-like and other fruit-like odors, are saponified to the trans alcohol (VI) (dehydrorhodinol) having a sweet rosy, rhodinol-like odor. The dehydrorhodinol (VI) is then cyclized to cis, trans rosoxide in substantially quantitative yield. It is obvious that the process of this invention, which provides a single isomer intermediate, has a marked advantage over the corresponding portion of the Seidel et al. rosoxide synthesis, which, according to U.S. Patent 3,161,657, leads to undefined mixtures of the acetates or the alcohols. Moreover, the pure trans-dehydrorhodinol (VI) obtained by saponification of its ester (V) provided by the new process, not only has a more rosy odor quality than the dehydrocitronellol present in the mixed alcohol isomers obtained by the Seidel et al. process, and therefore has great interest as a fragrance chemical per se, but is also more easily converted to rosoxide, and without the formation of substantial amounts of less fragrant by-products such as 2-(2'-methyl-2'-propen-1'-yl)-4-methyltetrahydropyran and its hydrate, 2-(2'-methyl-2'-hydroxypropen-1'-yl)-4-methyltetrahydropyran. These less fragrant by-products are obtained from the Seidel et al. dehydrocitronellol isomer, due to the more stringent conditions necessary for its cyclization. More specifically Seidel et al. U.S. Patent 3,161,657 indicates that a yield of only about 33% rosoxide mixture was obtained on cyclization of the dehydrocitronellol mixture, as compared to the 98% yield obtainable from the trans isomer (VI) derived from the single trans isomer (V) provided by the process of the present invention.

HYDROXYLATION

In the first step of the new process a citronellyl ester having 1 to 4 carbon atoms in the ester group (I), preferably the acetate, is reacted with a hydroxylating agent until substantially completely converted to 3,7-dimethyl-6,7-dihydroxyoctan-1-yl acetate (II) or other corresponding lower ester. The proportions of citronellyl acetate or other ester to hydroxylating agent may range from about 0.5 to 5 molar equivalents of the latter to the former, but are preferably in the range of about 0.9 to 1.25 moles of hydroxylating agent to 1 mole of the citronellyl esters. The reaction is carried out at a temperature in the range from about 0° to 100° C., and preferably in the range from about 50° to 80° C. The reaction is continued until substantially all of the citronellyl esters have been converted, which generally requires about 3 to 4 hours under the preferred temperature conditions, but may, of course, take more or less time at lower or higher reaction temperatures, respectively. The exothermicity of the reaction tends to maintain the desired reaction temperature and serves to indicate that the reaction is proceeding. A drop in the reaction temperature indicates that the reaction is subsiding and nearing completion. Confirmation of the completion of the reaction may be obtained by G.L.C. (SE 30 column at 200° C.) analysis to show disappearance of the citronellyl acetate or other ester and its conversion to the hydroxylate. Suitable hydroxylating agents are the organic peracids such as performic, peracetic and perbenzoic acids and the like, or a mixture containing about 10 to 90% hydrogen peroxide and about 90 to 10% of an organic acid such as formic acid or acetic acid, for example, with or without an added mineral acid, such as sulfuric acid. During the reaction, a potassium iodide test of a portion of the reaction mixture may be made to detect peroxide by liberating free iodine, thus indicating whether the hydroxylating agent (peracids or hydrogen peroxide) is still in excess.

The hydroxylation product, 3,7-dimethyl-6,7-dihydroxyoctan-1-yl acetate or other ester (II), can be isolated by removing the excess water and hydroxylating agent by evaporation under reduced pressure to provide a crude product. If desired or necessary, a pure product may be obtained by distillation under high vacuum according to known techniques. Alternatively, the crude reaction product may be neutralized and washed by pouring it onto aqueous caustic alkali and ice, and then removing the excess water by evaporation to obtain a crude dry product. Here again, if a pure product is desired, it may be obtained by the use of vacuum distillation. The neutralization isolation procedure is especially suitable if the crude reaction product contains a mineral acid catalyst.

ACYLATION

The second step of the new process, acylation of the hydroxylated citronellyl acetate or other ester (II), can be carried out on either the crude dried product or the pure distilled ester. The acylating agent is an organic acid anhydride containing 2 to 5 carbon atoms in the acyl groups, and preferably acetic anhydride which is used in excess; about 2 to 5 moles and, preferably, 2 to 3 moles of acetic anhydride, for example, being used per mole of 3,7-dimethyl-6,7-dihydroxyoctan-1-yl acetate (II). The reaction can be carried out at a temperature in the range from about 0° to 150° C. A temperature of about 25° to 40° C. is preferred when the acylation is carried out in the presence of a mineral acid catalyst such as sulfuric acid or preferably phosphoric acid. When no such catalyst is used, it is preferred to conduct the reaction at the reflux temperature of about 80° to 165° C. The reaction requires about 3 hours for completion when conducted under reflux conditions and correspondingly longer times under other temperature conditions, although the reaction time is shortened by the use of a mineral acid catalyst. The reaction is preferably allowed to continue until completion, which can be determined by G.L.C. (SE 30 column at 225° C.) analysis, and occurs when the hydroxylated reactant has disappeared with formation of the preferred polyacetates 3,7-dimethyl-1,6,7-triacetoxyoctane (III) and 3,7-dimethyl-1,6-diacetoxy-7-octene (IV), or other polyesters.

PYROLYSIS

The third and final step of the new process, neutral pyrolysis of the preferred polyacetates or other polyesters (III and IV), may be carried out at a temperature in the range from about 200° to about 600° C. but it is preferred to operate at about 400° to about 550° C. Below about 400° C. the pyrolysis of the preferred triacetate or triester (III) to the diester (IV) is the main reaction, whereas above about 450° C. the pyrolysis of the diacetate or diester (IV) takes place yielding the desired product, 3, 7-dimethyl-5, 7-octadiene-1-yl acetate or other ester (V). Above about 600° C. the pyrolysis reaction is accelerated, but at the expense of pyrolysis of desired product (V) to produce substantial amounts of unwanted terpene by-products. The pyrolysis can be carried out in any inert reaction vessel such as glass, steel, copper, stainless steel and the like. The reaction vessel should be free of Lewis acids but the reaction does not appear to be adversely affected by organic acids such as acetic, propionic and butyric acids, and the like. The pyrolysis reaction is preferably carried out continuously by feeding the polyesters or preferably polyacetates to a suitable packed column at a suitable rate. In this way the neutral pyrolysis of the polyacetates or other polyesters (III and IV) selectively produces trans-3, 7-dimethyl-5, 7-octadiene-1-yl acetate or esters (V), which can be recovered from the crude pyrolyzate as the substantially pure ester by conventional vacuum distillation techniques. The reaction can also be carried out in a single step to obtain compound (V) directly as described in Example 13 below.

In order to illustrate the invention, the following examples are given. The parts and percentages are by weight.

Example 1.—Hydroxylation 3, 7-dimethyl-6, 7-dihydroxyoctan-1-yl acetate (II).—594 g. of citronellyl acetate (I), 210 g. 40% formic acid were hydroxylated at 75–80° C. by the addition, within ½ hour, of 370 g. 30% hydrogen peroxide; (the hydroxylating agent being 14.5% HCOOH, 19% $H_2O_2$ and 66.5% $H_2O$). The reaction was completed by agitation at 75–80° C. for 3 to 4 hours until complete disappearance of the citronellyl acetate. 500 ml. cold water was added together with 300 ml. solvent (benzene or toluene) and after agitation for 5 to 10 minutes, tht top layer was separated and the solvent removed, leaving about 630 g. of 3, 7-dimethyl-6, 7-dihydroxyoctan-1-yl acetate (II) of about 95% purity, which could be used as such for the preparation of the corresponding triacetate (III). Distillation in a short Vigreux column afforded a 98% pure product B.P. 145–150° C. at 2 mm. $n_D^{20}$ 1.4570, which had an ester value of 239.5 as compared to the theoretical value of 241.4.

Example 2.—Acetylation 3, 7-dimethyl-1, 6, 7-triacetoxyoctane (III).—1,000 g. 3, 7-dimethyl-6, 7-dihydroxyoctan-1-yl acetate (II) preared as in Example 1 above, was fed within 15 minutes into 1,100 ml. boiling acetic anhydride (140–142° C.) and the mixture was kept under reflux for an additional three hours until the reaction was complete. A sample analyzed by GLC on an SE 30 column at 225° C. showed the following composition:

2–3% lights, 6–8% 3, 7-dimethyl-1, 6-diacetoxy-7-octene (IV) and 90–92% 3, 7-dimethyl-1, 6, 7-triacetoxyoctane (III).

The above reaction mixture was cooled to about 80° C. and a coarse vacuum (20–30 mm. Hg) was applied to remove the excess acetic acid-acetic anhydride mixture (about 600–700 g.). Then a high vacuum (2–3 mm. Hg) was applied to remove a small amount of light esters (20–30 g.). The residue amounting to 1270–1,320 g. $n_D^{20}$ 1.4450 consisting of about 7–8% IV and 92–93% of III was used as such for pyrolysis.

A vacuum distillation through a one foot Goodloe column separated IV from III and gave the following pure products:

(1) B.P. 2–3 mm./125–130° $n_D^{20}$ 1.4460, sap. value 433 (theory 437.5) 3, 7-dimethyl-1, 6-diacetoxy-7-octene (IV).
(2) B.P. 2–3 mm./140–150° $n_D^{20}$ 1.4440, sap. value 525 (theory 531.5) 3, 7-dimethyl-1, 6, 7-triacetoxy-octane (III).

Example 3.—Pyrolysis

Trans-3, 7-dimethyl-5, 7-octadien-1-yl acetate (V).—1,000 g. of pure distilled product from Example 2 cut #2 consisting of about 98% 3, 7-dimethyl-1, 6, 7-triacetoxy-octane (III) was fed at a rate of 10 ml./min. into a reactor consisting of a three foot Vycor glass column one inch in diameter (I.D.) and filled with about 200 g. ¼ inch Pyrex glass rings and kept at a temperature of 475° C. ±5° (a similar reactor made of stainless steel and filled with stainless steel cannon packing gave similar results). The pyrolyzate was condensed through a short spiral water condenser. The weight of the pyrolyzate corresponded to that of the feed indicating that no gaseous by-products were formed. The GLC analysis of the pyrolyzate on SE 30 column at 200° (not counting the acetic acid) showed approximately:

| | Percent |
|---|---|
| Lights (primarily terpenes and citronellyl acetate) | 2–3 |
| Heavies including III and IV | 21–23 |
| Trans-3, 7-dimethyl-5, 7-octadien-1-yl acetate (V) | 74–76 |

Upon distillation on a short one foot Goodloe column the acetic acid was distilled off under a coarse vacuum (20–30 mm. Hg) yielding about 360 g. acetic acid (pot temperature 90 to 100° C.) which contained approximately 20 to 25 g. of V (separated by quenching with 2 vol. of water and returned to the pot). The following cuts were then collected:

(1) B.P. up to 90° C. at 15 mm. = 25 g. $n_D^{20}$ 1.4570
(2) 80–90° C. at 2 mm. = 430 g. $n_D^{20}$ 1.4680
(3) including III, IV (for recycling) 160 g.

Cut #1 contained some lights and about 40 to 50% (V). Cut #2 which had a pleasant fruity pear-like odor was 98% pure trans-3, 7-dimethyl-5, 7-octadien-1-yl acetate (V) and 2% lights, saponification value 284, theory 285.7. It showed in the U.V. spectrum a $\lambda_{max.}$ 230 m$\mu$ $\epsilon=33800$ and $\lambda_{max.}$ 237 m$\mu$ $\epsilon=23100$ as compared with Siedel et al. $\lambda_{max.}$ 231.5 m$\mu$ $\epsilon=10700$ and $\lambda_{max.}$ 235 m$\mu$ $\epsilon=8500$. The infrared absorption spectra showed terminal=$CH_2$ bands at 6.2$\mu$ and 11.35$\mu$ (1620 and 880 cm.$^{-1}$) and trans band at 10.34$\mu$ (970 cm.$^{-1}$). It had a sap. value of 284, theory 285.7. The product was stabilized with 1% hydroquinone. Upon hydrogenation in the presence of palladium charcoal catalyst it was converted to 3,7-dimethyloctanyl-1-acetate (identified with authentic sample by infrared analysis).

Example 4.—Pyrolysis

Trans-3,7-dimethyl-5,7-octadiene-1-yl acetate (V).—1,000 g. of a crude product consisting of a mixture of about 92% III and 8% IV as obtained according to Example 2 was pyrolyzed as described in Example 3. The pyrolyzate (approx. 1,000 g.) showed by GLC analysis on a SE 30 column at 200° (not counting the acetic acid) the following approximate composition:

| | Percent |
|---|---|
| Lights | 2–3 |
| Trans-3,7-dimethyl-5,7-octadien-1-yl acetate (V) | 72–74 |
| Heavies including III and IV | 23–25 |

Example 5.—Pyrolysis

Trans-3,7-dimethyl-5,7-octadiene-1-yl acetate (V).—1,000 g. 3,7-dimethyl-1,6-diacetoxy-7-octene (IV) as obtained in Example 2 cut #1 consisting of about 95–98% of 3,7-dimethyl-1,6-diacetoxy-7-octene (IV) was pyrolyzed as in Example 3 and the pyrolyzate (approx. 1,000 g.) showed by GLC analysis on a SE 30 column at 200° C. (not counting the acetic acid) the following approximate composition:

| | Percent |
|---|---|
| Lights | 2–3 |
| Trans-3,7-dimethyl-5,7-octadien-1-yl acetate (V) | 76–78 |
| Heavies including IV | 20–22 |

After removal of the acetic acid (approx. 190 g.) the following cuts were collected:

1 light cut B.P. 90°/15 mm.=30 g. $n_D^{20}$ 1.4570 (containing 40–50% V)
2 B.P. 80–90° C./2 mm.=500–510 g. $n_D^{20}$ 1.4680 consisting of about 95–98% pure trans-3,7-dimethyl-5,7- octadienyl-1-acetate (V). The residue of about 200 g. consisted mostly of IV for recycling.

Example 6.—Saponification of V to VI 1,000 g. trans-3,7-dimethyl-5,7-octadien-1-yl acetate (V) were added to a solution of 8 g. sodium methoxide and 800 g. methanol and the mixture was refluxed through a short one foot Goodloe column while collecting the methyl acetate-methanol mixture at a temperature between 57–65° C. After about 1.5 hour a sample of the reaction mixture showed almost complete conversion to the corresponding alcohol trans-3,7-dimethyl - 5,7 - octadien-1-ol (VI) with less than 1–2% unreacted ester (V). The excess methanol was driven off under a coarse vacuum (pot temperature up to 90° C.) and the residue was thoroughly washed with a warm (40–60° C.) 10% acetic acid solution (250 ml.). The top layer was separated and distilled under vacuum yielding approximately 775 g. of a rose-rhodinol smelling odor consisting of trans-3,7-dimethyl-5,7-octadien-1-ol (VI) boiling at 100–105° at 3 mm. Hg $n_D^{20}$ 1.4860 showing a purity of over 98% (GLC on SE 30 column at 200° C.) and 2% light terpenes. It showed a U.V. spectrum with $\lambda_{max}$ 230 m$\mu$, $\epsilon$=25810, $\lambda_{max}$ 237 m$\mu$, $\epsilon$=17926; as compared to Siedel et al. loc. cit. $\lambda_{max}$ 232$\mu$, $\epsilon$=9700. The infrared spectrum showed the typical terminal=$CH_2$ bands at 6.2$\mu$ and 11.4$\mu$ (1620 and 875 cm.$^{-1}$) and a trans band at 10.4$\mu$ (965 cm.$^{-1}$) the carbon hydrogen analysis for $C_{10}H_{18}O$ gave C 77.63, H 11.59 as compared to a theoretical value of C 77.86 and H 11.76.

Upon hydrogenation over a palladium charcoal catalyst VI was converted into 3,7-dimethyloctan-1-ol (identified with an authentic sample by infrared analysis).

Example 7.—Cyclization of VI to rosoxide 1,000 g. of 3,7-dimethyl-5,7-octadien-1-ol (VI) and 500 ml. benzene containing 6 g. para-toluene-sulfonic acid were refluxed under an inert atmosphere (nitrogen or $CO_2$) at 85–95° C. for about 1½ hours until the reaction was almost complete. The reaction mixture showed about 4–6% of the starting material unreacted by GLC analysis on SE 30 column at 175° C. The reaction mixture was then neutralized and the solvent evaporated leaving a residue of about 950 g. $n_D^{20}$ 1.4560 which consisted of about 5–7% unreacted alcohol (VI) and a mixture of rosoxide (VII) consisting of about 70% cis and 30% trans-2-(2'-methyl-1'-propen-1'-yl) - 4 - methyl-tetrahydropyran with less than 1% of the terminal rosoxide isomer 2-(2'-methyl-2'-propen-1'-yl)-4-tetrahydropyran.

Although the process of the present invention produces trans-3,7-dimethyl-5,7-octadiene-1-yl acetate or other ester (V) which on saponification and cyclization provides cis-trans-2-(2'-methyl 1'-propen-1'-yl) - 4 - methyltetrahydropyran, it should be recognized that another rosoxide isomer also exists, i.e., cis-trans-2-(2'-methyl-2'-propen-1'-yl)-4-methyltetrahydropyran. Therefore, rosoxide exists in four forms since propen-1' and propene-2' position isomers each exist in two stereo-isomeric forms, i.e., the cis and trans forms. It is known that all four forms of rosoxide per se or in admixture, possess desirable olfactory properties of imparting a natural character to synthetic geranium oil and of enhancing the odor qualities of any of the natural oils of geranium. Amounts of these materials as low as about 0.1% to about 4% by weight, based on the weight of the natural oil of geranium markedly increase the strength of this oil, regardless of the source of the natural oil. As noted above, the trans-3,7-dimethyl-5,7-octadiene-1-yl acetate (V) intermediate, prepared according to the present invention, itself has a pleasant pear-like odor and is useful per se in blending fragrances, where a note of this character is desired. The corresponding alcohol, dehydrorhodinol (VI), as noted above, has a sweet rosy rhodinol-like odor, and is also useful per se for adding a note to this character to a blended fragrance.

The foregoing Examples 1 to 7 illustrate the preferred process of the invention in which citronellyl acetate is hydroxylated, acetylated, and pyrolyzed to form the desired trans-3,7-dimethyl-5,7-octadiene-1-yl acetate (V), and its conversion to rosoxide. Other aspects of the invention are specifically illustrated in the following Examples 8 through 13 in which other citronellyl esters are employed as starting materials and/or in which other acylating agents are substituted for acetic anhydride thus forming polyesters III and IV other than the acetates. It is also noted that mixed triesters (III), in which the 1-ester group differs from the 6- and 7-ester groups, can be made and used in the process.

Example 8.—Hydroxylation 3,7 - dimethyl - 6,7 - dihydroxyoctan-1-yl propionate (II).—350 g. citronellyl propionate (I) were fed under agitation within one hour between 25–30° C., into a mixture of 375 g. 40% peracetic acid and 375 g. 5% $H_2SO_4$; a slight cooling was necessary to absorb the heat from the exothermic reaction. After an additional hour most of the ester had reacted and the reaction mixture was neutralized by pouring over an ice cold 30% solution of NaOH (about 800 g.). The top layer weighing about 250 g. was separated and analyzed by GLC (SE 30 column at 225° C.) showing:

| | Percent |
|---|---|
| Citronellyl propionate (I) | 3–4 |
| 3,7 - dimethyl-1,6,7-octantriol | [1] 15 |
| 3,7 - dimethyl-6,7-dihydroxyoctan-1-yl acetate | 7 |
| 3,7 - dimethyl-6,7-dihydroxyoctan-1-yl propion (I) | 71 |
| 3,7 - dimethyl - 7 - hydroxy-6-acetoxy-1-propionoxy-octane | 8 |

[1] (The analysis of the triol was incomplete since a substantial portion of it was soluble in the aqueous layer).

The crude reaction mixture was distilled through a short one foot packed column and the 3,7-dimethyl-6,7-dihydroxyoctan-1-yl propionate (II) was collected at B.P. 0.5 mm./170–180° C. yielding about 150 g. $n_D^{20}$ 1.4580. Saponification value 229 (theory 232).

Example 9.—Acylation 3,7 - dimethyl-1,6,7-tripropionoxyoctane (III).—500 g. of 3,7-dimethyl-6,7-dihydroxyoctan-1-yl propionate (II) as described in the previous Example 8 was mixed with 750 g. propionic anhydride and refluxed for three hours at 160° C. After completion of the reaction the mixture was distilled in a Vigreux flask. After removal of the propionic acid-propionic anhydride mixture, 630 g. of 3,7-dimethyl-1,6,7-tripropionoxyoctane (III) were collected at B.P. 0.4 mm./160–165° C., $n_D^{20}$ 1.4445. The product showed a purity of about 95% (GLC SE 30 column at 225° C.), it contained about 4–5% of 3,7-dimethyl-1,6-dipropionoxy-7-octene (IV). The saponification value was 450 for a theoretical value of 468.

Example 10.—Acylation 3,7 - dimethyl-6,7-dipropionoxyoctan-1-yl acetate (III mixed ester).—100 g. 3,7-dimethyl-6,7-dihydroxyoctan-1-yl acetate (II) obtained as in Example 2 above and 150 g. propionic anhydride were refluxed at 165° C. for three hours. After completion of the reaction the mixture was distilled in a Vigreux flask. After removal of the propionic acid-propionic anhydride mixture 127 g. of 3,7-dimethyl-6,7-dipropionoxyoctan-1-yl acetate (III mixed triester) was collected B.P. 160–170° C. at 0.7 mm. pressure $n_D^{20}$ 1.4485. The product showed a purity of about 95% (GLC SE 30 column at 225° C.). It contained about 4–5% 3,7-dimethyl-6-propionoxy-7-octen-1-yl acetate. The saponification value showed 480 for a theoretical value of 489.

Example 11.—Pyrolysis

Trans-3,7-dimethyl-5,7-octadien-1-yl propionate (V).—100 g. of 3,7-dimethyl-1,6,7-tripropionoxyoctane (III Example 8) was pyrolyzed by passing through a 15 foot stainless steel coiled tube ¼ inch O.D. at 475° C. and at a flow rate of 4 ml./minute. The pyrolyzate (about 100 g.) was washed with water and distilled in a short Vigreux column yielding about 55 g. B.P. 2/100–150° C. which showed the following composition (GLC SE 30 at 225° C.): 85% trans-3,7-dimethyl-5,7-octadiene-1-yl propionate (V) and 16% 3,7-dimethyl-6-propionoxy-7-octene-1-yl propionate. Upon redistillation through a one foot Goodloe column, the pure trans-3,7-dimethyl-5,7-octadiene-1-yl propionate (V) distilled at 100° C. at 1.5 mm. pressure $n_D^{20}$ 1.4670. It had a saponification value of 261 for a theoretical value of 263. Upon saponification it afforded pure trans-3,7-dimethyl-5,7- octadiene-1-ol (VII) by 100–105° C. at 3 mm. $n_D^{20}$ 1.4860 identical with the product described in Example 6 (identification made by infrared spectroscopy).

Example 12.—Pyrolysis

Trans-3,7-dimethyl-5,7-octadien-1-yl acetate (V).—100 g. of 3,7 - dimethyl-6,7-dipropionoxyoctan-1-yl acetate (mixed triester Example 10) was pyrolyzed according to the conditions described in Example 11. The pyrolyzate (about 100 g.) was washed with water and distilled in a Vigreux flask yielding about 55 g. B.P. 100–160° C. at 2 mm. It consisted of a mixture containing 75% trans-3,7-dimethyl-5,7-octadiene-1-yl acetate and 25% of 3,7-dimethyl-6-propionoxy-7-octen-1-yl acetate.

Upon redistillation through a one foot Goodloe column the trans3,7-dimethyl-5,7-octadiene-1-yl acetate (V) was collected at 80–90° C. at 2 mm. pressure $n_D^{20}$ 1.4680. It had a saponification value of 283 for a theoretical value of 285.7 and was identical (by infrared spectroscopy) with trans-3,7-dimethyl-5,7-octadien-1-yl acetate (V) described in Example 3 above.

Example 13

3,7-dimethyl - 5,7 - octadien-1-yl butyrate (V).—100 g. citronellyl butyrate (I) were hydroxylated according to Example 8 with 100 g. 40% peracetic acid and 100 g. 5% $H_2SO_4$ at 25–30° C. After two hours the reaction was completed and the crude reaction mixture was washed three times with an equal amount of water and the top layer separated and dried under 30 mm. pressure by heating at 40–50° C. The crude hydroxylated product amounting to about 75 g. was mixed with 100 g. of acetic anhydride and heated at 80–90° C. for three hours. The crude reaction product was then washed in equal volume of hot water (50–60° C.) yielding 120 g. crude acetylated product consisting of about 10% 3,7 - dimethyl - 1,6,7-triacetoxyoctane (III) and about 70% 3,7 - dimethyl-6,7-diacetoxyoctan-1-yl butyrate (III mixed triester) and about 20% of a mixture of mixed acetyl and butyryl esters of 3,7 - dimethyl - 1,6 - dihydroxy-7-octene (analysis by GLC on SE 30 column at 225° C.).

The crude mixture was pyrolyzed as is according to Example 11 at 550° C. and 20 ml./min. and afforded a pyrolyzate which after washing with water and distillation in a Vigreux column yield 50 g. of a mixture consisting of about 20% trans - 3,7 - dimethyl - 5,7 - octadiene-1-yl acetate (V) and 60% of trans - 3,7 - dimethyl-5,7 - octadiene-1-yl butyrate (V) and 20% of mixed acetyl and butyryl esters of 3,7-dimethyl - 1,6 - dihydroxy-7-octene. Upon redistillation through a one - foot Goodloe column the trans - 3,7 - dimethyl - 5,7 - octadien-1-yl butyrate (V) was collected at 110–112° C. at 2 mm. pressure $n_D^{20}$ 1.4670 with a faint fruity butyric odor. Saponification value 248 for a theoretical value of 250. Upon saponification according to Example 6 above it yielded pure trans - 3,7 - dimethyl - 5,7 - octadien-1-ol (VI) B.P. 100–105° C. at 3 mm. $n_D^{20}$ 1.4865 as identified by infrared analysis with the product of Example 6. Saponification of the corresponding acetate ester formed in this example would also yield the pure compound (VI) for conversion to rosoxide.

The present invention also includes an improved method for the conversion of the trans - 3,7 - dimethyl-5,7-octadiene-1-ol esters (V) to rosoxide by saponification to the corresponding alcohol (VI) and cyclization of the latter employing 10% to 30% sulfuric acid as the cyclizing agent. The process provides a mixture of the cis, trans rosoxide isomers containing about 90% of the cis isomer, which has more desirable olfactory properties than the trans isomer as compared to the conversion method of Seidel et al., as applied in Example 7 above, which produces a mixture of rosoxide in which the ratio of cis to trans isomers is only 70:30. The improved conversion method of this invention is illustrated in the following example.

Example 14

Trans - 3,7 - dimethyl - 4,7 - octadiene-1-yl acetate (V) was saponified according to the procedure of Example 6 above to produce trans - 3,7 - dimethyl - 5,7-octadiene-1-ol (VI). 1,000 g. of trans-3,7 - dimethyl-5,7-octadien-1-ol (VI) and 1,000 g. 30% $H_2SO_4$ were vigorously agitated at room temperature (20–30° C.) for 1.5 to 2 hours under an inert atmosphere (nitrogen or $CO_2$) until a sample of the reaction mixture had shown the practical disappearance of the starting material (GLC analysis on a SE 30 column at 175° C.). The top layer was separated and neutralized with 4% NaOH yielding approximately 975 g. rosoxide (VII) $n_D^{20}$ 1.4545. Upon distillation through a one foot Goodloe column a main cut weighing about 950 g. $n_D^{20}$ 1.4545 was obtained. It consisted of a mixture of about 90% cis and 10% trans rosoxide (VII), 2 - (2′ - methyl - 1′ - propen - 1′ - yl)-4-methyltetrahydropyran containing less than 1% of the terminal isomer 2 - (2′ - methyl - 2′ - propen - 1′ - yl)-4-tetrahydropyran.

The foregoing illustrates the practice of this invention, which, however, is not to be limited thereby, but is to be construed as broadly as permissible in view of the prior art and limited solely by the appended claims.

What is claimed is:

1. The process which comprises reacting a citronellyl ester having the formula:

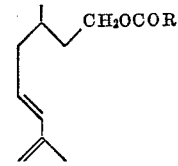

wherein R is selected from H and a lower alkyl group containing 1 to 3 carbon atoms, with a hydroxylating agent selected from the group selected from performic acid, peracetic acid, perbenzoic acid and a mixture containing about 10 to 90 percent hydrogen peroxide and about 90 to 10 percent of a lower aliphatic carboxylic acid, with or without a mineral acid, at a temperature from about 0° C. to 100° C. to form a 3,7-dimethyl-6,7-dihydroxy-octan-1-yl ester, acylating the latter by reacting it with a fatty acid anhydride containing 2 to 5 carbon atoms in the acyl group, at a temperature from about 0° C. to 150° C., and heating the resulting polyesters under neutral conditions to decompose same, thereby to form a trans-3,7-dimethyl-5,7-octadiene-1-yl ester having the structural formula:

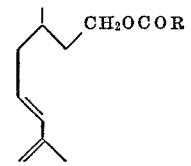

2. The process of claim 1, wherein the pyrolysis of the polyesters is carried out at a temperature in the range from about 200° to about 600° C.

3. The process of claim 1, wherein the pyrolysis of the polyesters is carried out at a temperature in the range from about 400° C. to about 550° C.

4. The process of claim 1, wherein the pyrolysis of the polyesters is carried out at a temperature in the range from about 450° C. to about 600° C.

5. The process of claim 1, wherein the hydroxylating agent is selected from the group consisting of a mixture of formic acid and hydrogen peroxide, and a mixture of peracetic acid and sulfuric acid.

6. The process of claim 1, wherein the hydroxylating agent is a mixture of formic acid and hydrogen peroxide, the acetylating agent is acetic anhydride, and the pyrolysis is carried at a temperature in the range from about 450° C. to about 550° C.

7. A process according to claim 1, wherein citronellyl acetate is hydroxylated to form 3,7 - dimethyl - 6,7 - dihydroxyoctan-1-yl acetate, the latter is acetylated to form a mixture of 3,7 - dimethyl - 1,6,7 - triacetoxyoctane and 3,7 - dimethyl - 1,6 - diacetoxy - 7 - octene, and pyrolyzing said mixed polyacetates under neutral pH conditions to form trans-3,7-dimethyl-5,7-octadiene-1-yl acetate.

8. A process according to claim 1, wherein citronellyl propionate is hydroxylated to form 3,7 - dimethyl - 6,7-dihydroxyoctan-1-yl propionate, the latter is acetylated to form 3,7 - dimethyl - 6,7 - diacetoxyoctan-1-yl propionate, and the latter is pyrolyzed under neutral pH conditions to form trans-3,7-dimethyl-5,7-octadiene-1-yl propionate.

9. A process according to claim 1, wherein citronellyl acetate is hydroxylated to form 3,7 - dimethyl - 6,7 - dihydroxyoctan-1-yl acetate, the latter is acetylated to form 3,7 - dimethyl - 6,7 - dipropionoxyoctan-1-yl-acetate, and the latter is pyrolyzed under neutral pH conditions to form trans-3,7-dimethyl-5,7-octadiene-1-yl acetate.

10. A process according to claim 1, wherein citronellyl propionate is hydroxylated to form 3,7-dimethyl - 6,7-dihydroxyoctan-1-yl propionate, and the latter is acylated to form 3,7-dimethyl - 1,6,7 - tripropionoxyoctane, and the latter is pyrolyzed under neutral pH conditions to form trans-3,7-dimethyl-5,7-octadiene-1-yl propionate.

11. A process according to claim 1, wherein citronellyl butyrate is hydroxylated to form 3,7-dimethyl-6,7-dihydroxyoctan-1-yl butyrate, the latter is acetylated to form 3,7 - dimethyl - 6,7 - diacetoxyoctan-1-yl butyrate and the latter is pyrolyzed under neutral pH conditions to form trans-3,7-dimethyl-5,7-octadiene-1-yl butyrate.

12. A process according to claim 7, wherein the hydroxylating agent is a mixture of formic acid and hydrogen peroxide, the acetylating agent is acetic anhydride, and the pyrolysis is carried out at a temperature in the range from about 450° to about 500° C.

13. A process according to claim 7, wherein the hydroxylating agent is a mixture of peracetic acid and aqueous sulfuric acid, the acetylating agent is selected from the group consisting of acetic acid anhydride, propionic acid anhydride and butyric acid anhydride, and the pyrolysis is carried out at about 550° C.

References Cited

UNITED STATES PATENTS 3,166,575  1/1965  Naves _____ 260—345.1

OTHER REFERENCES

Chem. Abstracts, 61: 7048g, h (1965).
Chem. Abstracts, 56: 14329g (1962).
Chem. Abstracts, 60: 12060 (1964).

LORRAINE A. WEINBERGER, Primary Examiner

V. GARNER, Assistant Examiner

U.S. Cl. X.R.

260—345.1, 491, 631.5